US007444344B2

(12) United States Patent
Galindo-Legaria et al.

(10) Patent No.: US 7,444,344 B2
(45) Date of Patent: Oct. 28, 2008

(54) METHOD TO INCREASE SUBSCRIPTION SCALABILITY

(75) Inventors: Cesar A. Galindo-Legaria, Redmond, WA (US); Goetz Graefe, Bellevue, WA (US); Florian M. Waas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 10/608,298

(22) Filed: Jun. 27, 2003

(65) Prior Publication Data

US 2004/0267769 A1    Dec. 30, 2004

(51) Int. Cl.
G06F 17/30    (2006.01)
(52) U.S. Cl. .................. 707/101; 707/6; 707/104.1
(58) Field of Classification Search ............... 707/2–3, 707/101, 104.1
See application file for complete search history.

(56) References Cited

U.S. PATENT DOCUMENTS

| 5,832,477 | A  | * | 11/1998 | Bhargava et al. ............. 707/2 |
| 6,226,618 | B1 | * | 5/2001  | Downs et al. ................ 705/1 |
| 6,356,887 | B1 | * | 3/2002  | Berenson et al. ............. 707/2 |
| 6,505,189 | B1 | * | 1/2003  | On Au et al. ................ 707/2 |
| 6,910,070 | B1 | * | 6/2005  | Mishra et al. ............. 709/224 |
| 7,013,311 | B2 | * | 3/2006  | Hui et al. ................ 707/104.1 |
| 7,209,916 | B1 | * | 4/2007  | Seshadri et al. ............. 707/3 |
| 2004/0002958 | A1 | * | 1/2004  | Seshadri et al. ............. 707/3 |
| 2004/0243576 | A1 | * | 12/2004 | Shrivastava et al. ........... 707/5 |

OTHER PUBLICATIONS

Ashayer, G. et al., "Predicate Matching and Subscription Matching in Publish/Subscribe Systems", *Proceedings 22nd International Conference on Distributed Computing Systems Workshops, IEEE Comput. Soc.*, 2002, 539-546.
Celik, A. et al., "I-DG and HI-DG: Scalable and Efficient Techniques for Subscription-Based Data Dissemination Via IP Multicasting", *Electronic Commerce Research*, 2003, 3(1-2), 143-165.
Crespo, A. et al., "Query Merging: Improving Query Subscription Processing in a Multicast Environment", *IEEE Transactions on Knowledge and Data Engineering*, 2003, 15(1), 174-191.

(Continued)

*Primary Examiner*—Don Wong
*Assistant Examiner*—Hanh B Thai
(74) *Attorney, Agent, or Firm*—Woodcock Washburn LLP

(57) ABSTRACT

Systems and methods are provided to increase the scalability of subscriptions in an electronic database environment. In an illustrative implementation, a computing application comprises at least one instruction set to cooperate with a data environment to optimize the processing of subscriptions by the data environment when communicating with cooperating services and/or applications. In operation, a subscription is identified. A subscription template is created for the subscription and the subscription template is parameterized to create a parameter table containing parameters (e.g. subscription constants). A join is then performed between the parameters of the parameter table and the parameterized subscription templates to generate application and/or service data required by the cooperating services and/or applications. The data is then processed by the applications and/or services.

19 Claims, 6 Drawing Sheets

OTHER PUBLICATIONS

Filman, R.E. et al., "Managing Distributed Systems with Smart Subscriptions", *Proceedings of the International Conference on Parallel and Distributed Processing Techniques and Applications. PDPTA*, 2000, 2, 853-859.

Triantafillou, P. et al., "Subscription Summaries for Salability and Efficiency in Publish/Subscribe Systems", *Proceedings 22$^{nd}$ International Conference on Distributed Computing Systems Workshop, IEEE Comput. Soc*, 2002, 619-624.

* cited by examiner

METHOD TO INCREASE SUBSCRIPTION SCALABILITY

FIELD OF THE INVENTION

The invention relates generally electronic databases. More particularly, the invention relates to subscription changes and scalability in an electronic database environment.

BACKGROUND OF THE INVENTION

As computing and communications technologies have advanced, there has been and continues to be a globalization of market places and the expansion of business and governmental enterprises alike. The geographic limitations of sharing data and information across large spans are becoming a distant memory. Moreover, with these technological advances, computing applications which were once slated for use on stand alone machines are being deployed across, what are often, large computing environment networks and platforms. As more data and computing applications become shared, there arises a need to monitor and control the systems that house data to ensure that they are properly functioning and protect against unwanted down time which could translate into lost revenues.

An enterprise's computing environment might contain hundreds of server computers and, possibly, thousands of client computers, all in communication to share applications and application data. Such computing environment might also support vast database systems for use to store application data. Today's data stores, or databases, are designed to operate on a single stand alone machine or among several computing machines (e.g. computer database servers) and cooperate with the computing environment to accept data for storage and/or to provide data to a requesting application. Given the importance of an enterprise's data, significant efforts have and are being made to ensure that the database applications operate in an optimal manner.

On the flip side, computing and networking technologies have transformed many important aspects of the home life, as well. Computers have become a household staple instead of a luxury, educational tool and/or entertainment center, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

Traditional business practices are evolving with computing and networking technologies. For example, a conventional banking transaction can include gathering information such as bank account number, passbook and identification, dedicating time to travel to the bank, procuring transportation, waiting in line and utilizing a teller to facilitate a banking transaction. Today, a consumer can access his/her account via the Internet and perform a growing number of available transactions such as balance inquiries, funds transfers and bill payment with the click of a mouse button.

As computing and networking technologies become robust, secure and reliable, more consumers, wholesalers, retailers, entrepreneurs, educational institutions, advocacy groups and the like are shifting paradigms and employing the Internet to perform business instead of the traditional means. For example, many businesses and consumers are providing web sites and/or on-line services (e.g., for purchasing food and clothing, searching for information, sending email and playing interactive games). In another example, a stock market web site can provide the user with tools for retrieving stock quotes and purchasing stock.

Typically, a user interfaces with a client(s) application (e.g., a web page) to interact with a server(s) that stores information in a database that is accessible to the client application. Databases provide a persistent, durable store for data that can be shared across multiple users and applications. Client(s) applications generally retrieve data from the database through a query(s), which returns results containing the subset of data interesting to the application. The application then consumes, displays, transforms, stores, or acts on those results, and may submit changes based on the results retrieved.

Once results are retrieved, changes may be made to the data in the database and the client notified using the Database Change Notifications mechanism. A database change notification mechanism is describe more fully in co-pending, commonly assigned, U.S. patent application Ser. No. 10/402,025, filed on Mar. 28, 2003, entitled, "SYSTEMS AND METHODS FOR REQUESTING AND RECEIVING DATABASE CHANGE NOTIFICATIONS," which is herein incorporated by reference in its entirety.

Currently, the database change notifications mechanism operates to provide notification to subscribers of changes in the database. In operation, the Database Change Notifications provides an interface for collecting subscriber and subscription data, and contains components that collect events and generate, format and distribute notifications. To send notifications, the Notifications mechanism obtains information about subscribers (e.g. the information that subscribers are interested in, and information about where to send information). A subscriber obtains a subscription to the Notification mechanism to obtain and process desired data. In the context of business application and data environments, many business scenarios require the change detection mechanism scale to a very large number of parameterizeable client queries. Such processing by the Notifications mechanism be extremely time intensive and a drain on precious resources as each subscription (e.g. query) must be processed by the Notifications mechanism. A more advantageous practice contemplates the use of the subscription parameters to alleviate the processing burden.

From the foregoing, it is appreciated that there exists a need to overcome the prior art.

SUMMARY OF THE EMBODIMENTS OF THE INVENTION

Systems and methods are provided to increase the scalability of subscriptions in an electronic database environment. In an illustrative implementation, a computing application comprises at least one instruction set to cooperate with a data environment to optimize the processing of subscriptions by the data environment when communicating with cooperating services and/or applications. In operation, a subscription is identified. A subscription template is created for the subscription and the subscription template is parameterized to create a parameter table containing parameters (e.g. subscription constants). A join is then performed between the parameters of the parameter table and the parameterized subscription templates to generate application and/or service data required by the cooperating services and/or applications. The data is then processed by the applications and/or services.

Other aspects of the invention are described below.

BRIEF DESCRIPTION OF THE DRAWINGS

The herein described system and methods to increase subscription scalability are further described with reference to the accompanying drawings in which.

DETAILED DESCRIPTION OF ILLUSTRATIVE IMPLEMENTATION

Figure 1:
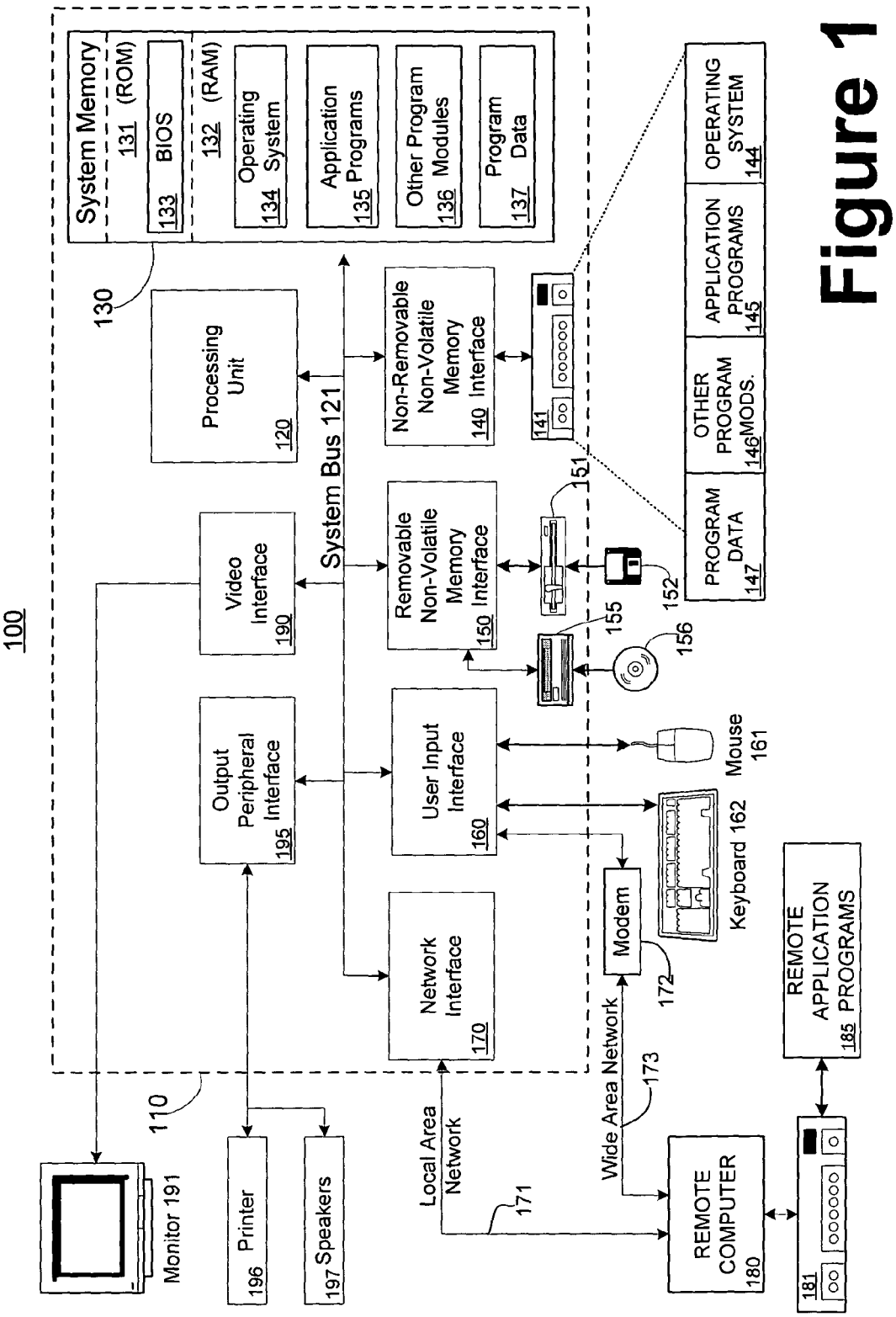
FIGS. 1 and 2 are schematic illustrations of exemplary computing environments suitable for the present invention, with FIG. 2 depicting an exemplary networked computing environment.

Overview:

For every query submitted to database system by a client, the query processor of generates a query plan which gets optimized and executed against the data in the database.

The feature of Database Change Notifications allows clients to subscribe to a query, i.e. the client annotates the query with a subscription request. The processing of Database Change Notifications is further described in co-pending, commonly assigned, U.S. patent application Ser. No. 10/402, 025, filed on Mar. 28, 2003, entitled, "SYSTEMS AND METHODS FOR REQUESTING AND RECEIVING DATABASE CHANGE NOTIFICATIONS," which is herein incorporated by reference in its entirety. For each subscription, SQL Server's Notification Manager (NM) retains the particular query plan. In case data gets modified in the database, the NM runs the query plans of all dependent subscription on the modified data to detect whether the query results the client has subscribed to are affected by the change.

For example, given a client subscribes to the query:
SELECT name, subject
FROM users, mail
WHERE users.id=mail.recipient AND user.name='Joe'
For a modifying operation like
INSERT INTO mail VALUES (12343, 'Re: Party on Friday', 'Hey Joe, . . . ')

The query processor determines which rows in the table are affected. It provided example mail_delta is the set of rows affected by the update (1 row in this case; a set of rows in general, however).

By evaluating the subscribing query on mail_delta
SELECT name, subject
FROM users, mail_delta
WHERE users.id=mail.recipient AND user.name='Joe'
the notification manager (NM) can determine whether the subscribing query is affected.

Where several clients have subscribed with queries that reference table A, all corresponding query plans must be evaluated. In such case, subscriptions can be complex queries that are expensive (e.g. on processing resources) to execute. It follows that the performance of data modifying operations is further decreased with increasing number of subscriptions.

The herein described system and methods provide for an increase in the scalability of subscriptions that takes advantage of the fact that clients submit very similar queries when subscribing; very often, the queries differ only in constants used in predicates. For example, in the above case, a mail client application would subscribe with the same query but only use different user names instead of 'Joe'.

Removing the constants from the query plan results in folding the plans of the different subscriptions into one single query template. That is, the query template may exist as a table having a constant-free form of the query. In operation, the constants together with an identifier of the subscription are stored in a separate table. Subsequently, when the database change notifications is processing the data for potential changes, the newly created table is joined with the result of the constant-free query template. The query processor is left to evaluate a single query template (with an additional join), instead of evaluating a potentially large number of dependent query plans.

It is appreciated that although the herein described systems and methods are described in the context of the provided exemplary illustration which is based on an SQL Server data environment, that such description is merely exemplary as the inventive concepts described can be applied in various ways in various data environments.

A. Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Exemplary Networked Computing Environment

Figure 2:
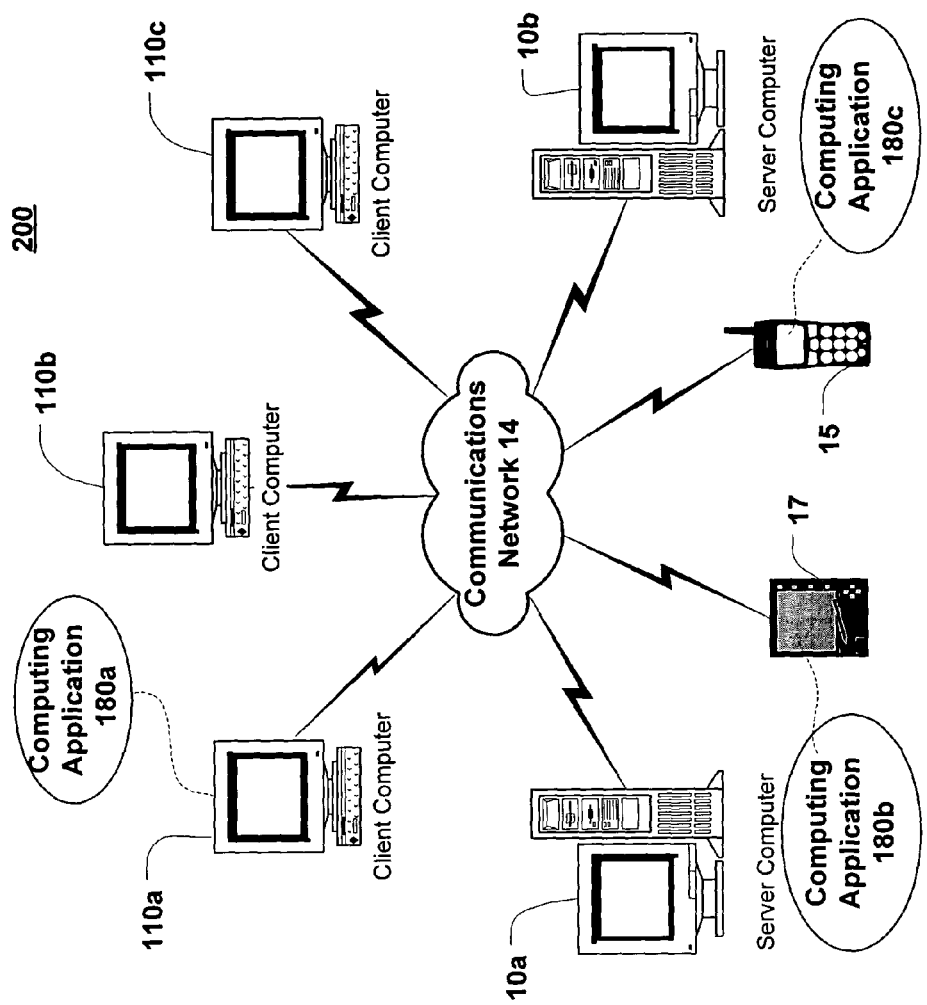

Computer environment 100, described above, can be deployed as part of a computer network. In general, the above description for computers applies to both server computers and client computers deployed in a network environment. FIG. 2 illustrates an exemplary network environment 200, with a server in communication with client computers via a network, in which the present invention may be employed. As shown in FIG. 2, a number of servers 10a, 10b, etc., are interconnected via a communications network 14 (which may be a LAN, WAN, intranet, the Internet, or other computer network) with a number of client computers 110a, 110b, 110c, or computing devices, such as, mobile phone 15, landline telephone 16, and personal digital assistant 17. In a network environment in which the communications network 14 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180a to gain access to the servers 10. Similarly, personal digital assistant 17 can be equipped with browser 180b and mobile phone 15 can be equipped with browser 180c to display and receive various data.

In operation, a user (not shown) may interact with a computing application running on a client computing devices operating to increase subscription scalability. The subscriptions, query plans, and notifications may be stored on server computers and communicated to cooperating users through client computing devices over communications network 160. A user may generate, manage, and interact with subscription, query plans, and parameter tables by interfacing with computing applications on client computing devices. These transactions may be communicated by client computing devices to server computers for processing and storage. Server computers may host computing applications to increase subscription scalability.

Thus, the present invention can be utilized in a computer network environment having client computing devices for accessing and interacting with the network and a server computer for interacting with client computers. However, the systems and methods described herein can be implemented with a variety of network-based architectures, and thus should not be limited to the example shown. The herein described systems and methods will now be described in more detail with reference to a presently illustrative implementation.

C. Subscription Scalability

Figure 3:
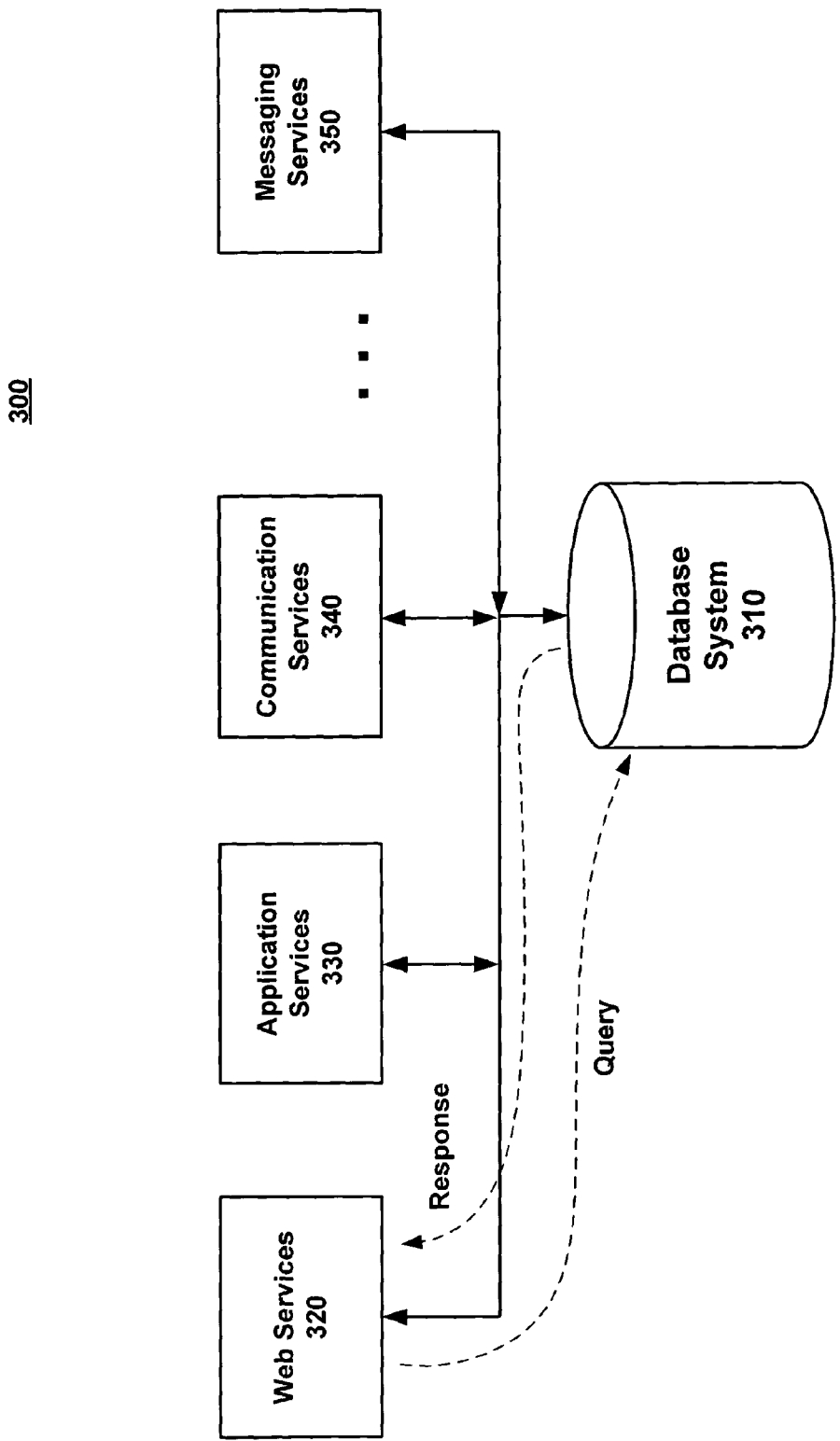
FIG. 3 is a block diagram of an exemplary subscription based environment.

FIG. 3 shows exemplary data environment 300. Exemplary data environment 300 comprises database system 310 and various services, such as, Web services 320, application services 330, communication services 340, and messaging services 350. As shown, the various services 320, 330, 340, and 350 are in communication with database system 310 to provide and receive data to and from database system 310. In operation, as indicated by the dashed arrows, services 320, 330, 340, or 350 may provide a query on database system 310 and database system 310, responsive to such query may provide a response. In the context of subscriptions, one or more of the services, 320, 330, 340, or 350 may act as subscribers to database system 310. As subscribers, they are provided notifications of changes in database system 310 by database system 310 through a notification changes mechanism.

In a contemplated illustrative implementation, one or more services subscribe to database system 310 to obtain notification changes. Notification changes, as previously described, is a mechanism which acts upon database system 310 to identify which data delivered to one or more services has changed. If data has changed, the services are notified and new data is provided. When a service (e.g. service 320, 330, 340, and 350) subscribe to database system 310, it provides database system with a query. This query is then processed by database system 310 and the notification changes mechanism (not shown) to provide current data and to update the provided data when the data in database system 310 changes.

For example, in exemplary data environment 300, Web services 320 may represent a cooperating web server obtaining price data from database system 310 which stores data for an exemplary e-commerce web site. Web services 320, qualifies itself as a subscriber to database system 310, and offers a query to database system 310 to obtain desired price data. Database system 310 in conjunction with a notification change manager (not shown) associates the query with a subscription ID, stores the query, and processes the query to retrieve desired price data. In the event that database system 310 is updated with new price data, notification changes manager (not shown) identifies which data has changed and process a list of subscription IDs to identify which services require notification of the price data modifications. In this example, the notification changes manager (not shown) identifies that web services 320 is a subscriber and requires notification of the price data update. Accordingly, database system 310 is queried, using the original query provided by web services 320, to retrieve for communication the updated price information to web services 320.

By way of a practical example, a user may navigate through a web browser to an e-commerce site (e.g. the e-commerce site's web server serving the user's web browser) to purchase a product. In the first instance, the user may request price information about a desired product. The web server serving the user subscribes to the e-commerce site's price database system. The price request is satisfied by the e-commerce's database system. In the event that the price for the desired product is updated during the user's session, the first provided price information is updated with the updated price information since the web server serving the user is a subscriber to the e-commerce's price database system.

It is appreciated that although exemplary data environment 300 is described to comprise a particular configuration of services and servers and is offered in context to the above exemplary illustrations, that the inventive concepts described herein are applicable to various data environments having various data configurations for the realization of various data communication scenarios.

Figure 4:
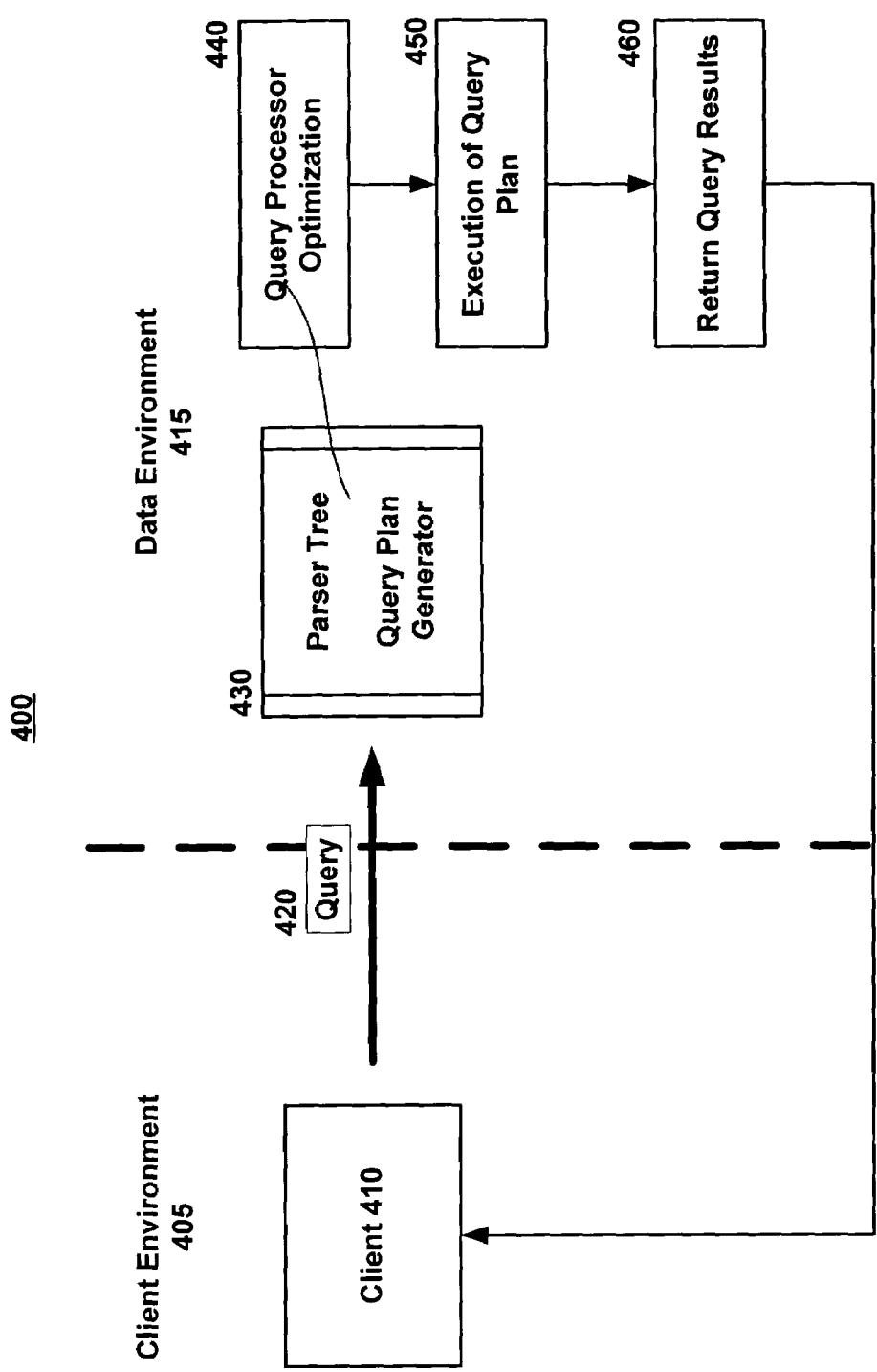
FIG. 4 is a block diagram of the data flow between cooperating environments to realize subscription scalability.

FIG. 4 shows exemplary computing environment 400 for use in subscription scalability. As shown, exemplary computing environment 400 comprises client environment 405 having client 410 and data environment 415 which itself comprises parser tree/query plan generator 430. During query parsing and query generation, query parser/query plan generator 430 engages distinct steps comprising query processor optimization 440, execution of query plan 450, and query results return 460. In operation, a query 420 is provided by client 410 of client environment 405 to the parser tree/query plan generator 430 of database environment 415. The query, is parsed and for which a query plan is generated, by first engaging in query processor optimization as shown by block 440. In this step, the query is preferably optimized to remove redundancies and inefficiencies. The query processor optimization step generates a query plan which is then executed at block 450 and the results of which are returned to the client at block 460.

Figure 5:
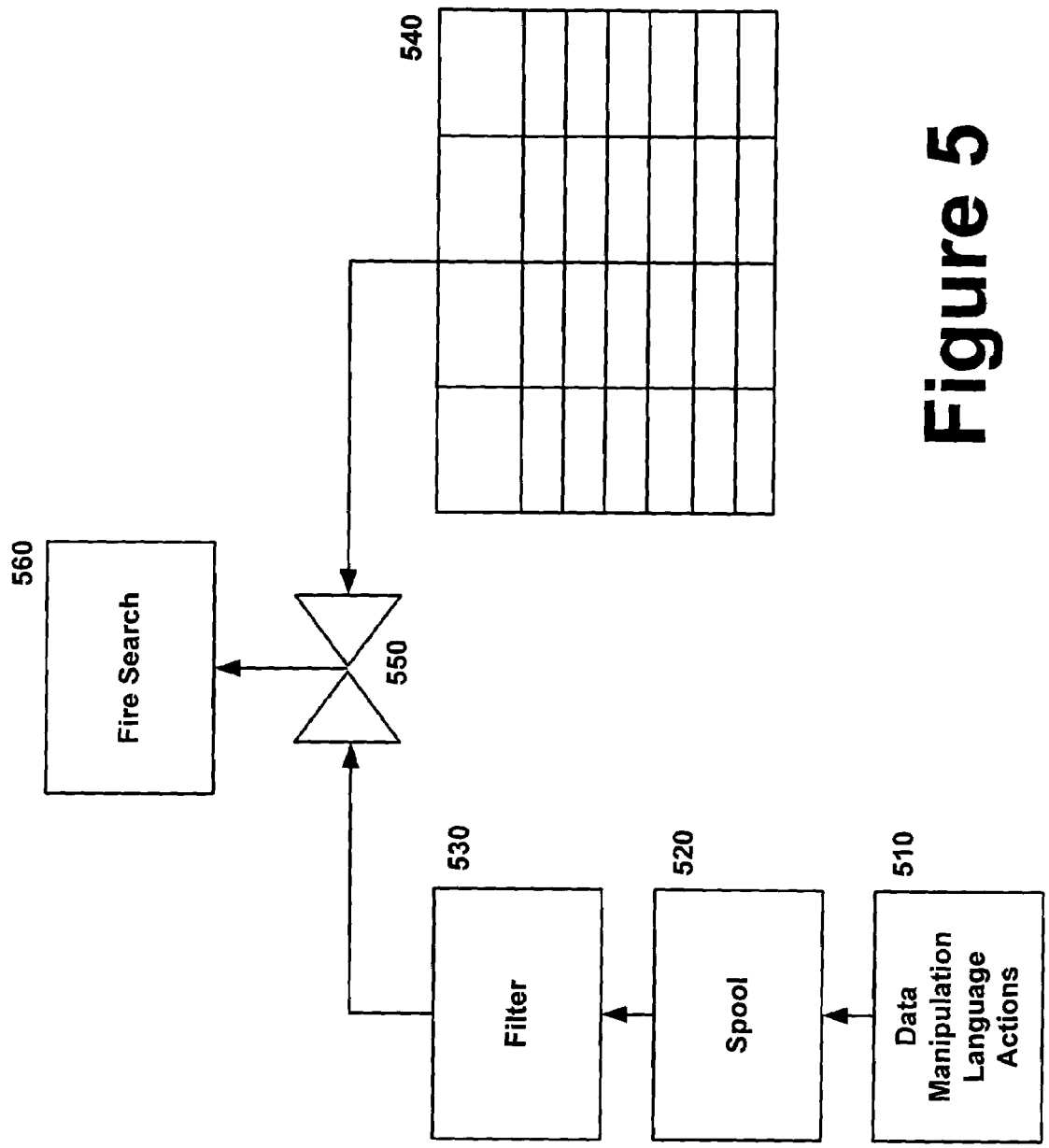
FIG. 5 is a block diagram of the cooperation the components of an exemplary subscription scalability system to increase subscription scalability.

FIG. 5 shows exemplary subscription scalability system 500. As shown exemplary subscription scalability system 500 comprises actions 510, spool 520, filter 530, parameter table 540, join 550, and search action 560. In FIG. 5, a query plan corresponding to a modification query (e.g. an SQL statement that inserts one or more data tuples (=rows) into an exemplary table (e.g. mail table from the below example)). The actions represented by actions 510 may be considered to be the actions performed in the data environment to effect the desired changed (e.g. inserting rows into an exemplary table). The output of actions 510 may comprise rows which have been modified (e.g. inserted and/or deleted). In context to the provided examples, the output of actions 510 may comprise data that is relevant for any subscription that references the modified table.

In operation, actions 510 are executed to achieve a desired outcome on the underlying tables supporting a subscription of a database environment (e.g. adding rows). The results of actions 510 (e.g. data from the rows) are then spooled by spool 520. The spooled data is then filtered according to pre-defined filter constraints by filter 540. The resultant filtered data is then joined with parameters (not shown) from parameter table 540 by join function 550. The result of the join function 550 is a query template for execution by the fire search function 560. The fire search function executes the query on cooperating data stores (not shown) to obtain desired data. Exemplary subscription scalability system 500 is more fully described by the following illustrative implementation.

For every query that is submitted to the database server with a subscription request, the query processor maintains a mechanism that enables it to detect whether a change in the underlying data will affect the result of this query. Such mechanism may comprise a notification manager (as described above). For example, given an email client application that subscribes with a multitude of independent queries like the following ones:
SELECT name, subject
FROM users, mail
WHERE users.id=mail.recipient AND user.name='Joe' and
SELECT name, subject
FROM users, mail
WHERE users.id=mail.recipient AND user.name='Jack'

The notification manager (NM) removes the parameters from the query and stores them in a parameter table of the form as follows:

CREATE TABLE parameter_table (param_1 NVARCHAR(20))

In the example provided there is one parameter table per query template. The number of columns in the table as well as the type depend on number and type of the parameters in the original query. In this example, the name of a user was given the type NVARCHAR(20). Per subscription, one row with the actual parameter(s) is inserted in the parameter table.

It is appreciated that additional information such as an identifier, the user-id of the subscriber, etc., and subscriber routing information may also stored in the table. For data manipulating queries such as insert, delete, or update operations, the query templates which depend on the table that is modified are evaluated with the set of modified rows in the table (delta). In the above example the query template is evaluated whenever the table name or subject is modified. There might be more than one depending template for a base table.

The resulting change detection query without query templates is,
SELECT name, subject
FROM users, mail_delta
WHERE users.id=mail.recipient AND user.name='Joe'
UNION ALL
SELECT name, subject
FROM users, mail_delta
WHERE users.id=mail.recipient AND user.name='Jack'
UNION ALL
. . .

with additional UNION ALL branches for every further subscription.

It is appreciated that without query templates, the underlying database system is not easily scalable. Specifically, as the database system accepts increasing subscriptions for which notification changes must be created and associated queries performed, the database system's operational efficiency is drastically and negatively impacted. With increasing subscriptions, the database must build query plans for each subscription, store the query plans, and execute the query plans. As subscriptions ramp up, the amount of data stored and operations executed become astronomical.

Using query templates, the change detection query can be formulated as,
    SELECT name, subject
    FROM
(SELECT name, subject
FROM users, mail_delta
WHERE users.id=mail.recipient) as delta
JOIN
parameter_table
ON delta.name=parameter_table.param_1

The plan is independent of the number of subscriptions—their individual parameters are stored in parameter_table and are addressed by the join predicate.

It is appreciated that although exemplary subscription scalability system 500 is described to comprise a particular configuration and is offered in context to the above exemplary illustration, that the inventive concepts described herein are applicable to subscription environments having various data configurations for the realization of various data communication scenarios. Moreover, it is appreciated that the parameterization techniques employed herein are not limited to one constant per subscription but rather can accommodate any number of subscriptions. In the example provided the subscription was not only filtering on given names but also on the time mail has arrived.

Figure 6:
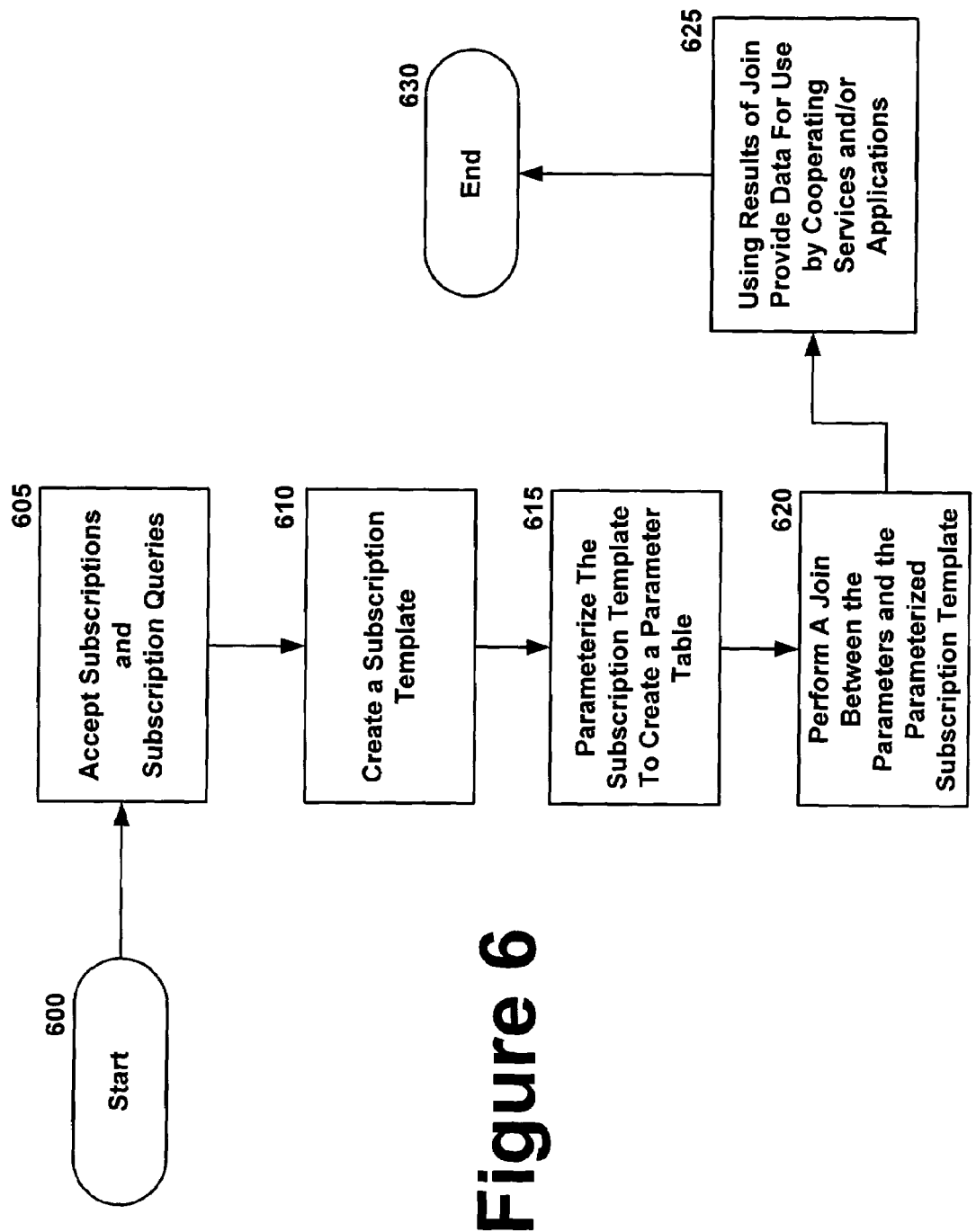
FIG. 6 is a flowchart diagram of the processing performed to increase subscription scalability.

FIG. 6 shows a flowchart which generally describes the processing performed by subscription scalability system 500 (not shown). As shown, processing begins at block 600 and proceeds to block 605 where subscriptions and subscription queries. From there processing proceeds to block 610 where a subscription template is created for the subscription queries. The subscription template is then parameterized at block 615 to create a parameter table. A join is then performed at block 620 between the parameters of the newly created parameter table and the parameterized subscription template to populate the subscription template with the appropriate parameters to generate a desired query. Using the results of the join the data is retrieved and provided to cooperating services and/or applications at block 625.

D. Conclusion

In sum, the herein described systems and methods increase subscription scalability in data environments. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed:

1. A method for providing notifications of changes in a database system, comprising:
   receiving a plurality of SQL query statements for querying a relational database system, each SQL query statement corresponding to a computing application that has subscribed to receive notification of changes in the database system affecting data retrieved from the database system by the computing application;
   creating a subscription template from the plurality of SQL query statements, the template not comprising any constants;
   generating a parameter table from the plurality of SQL query statements, the parameter table comprising for each SQL query statement a constant representing a query value, a subscription identification value uniquely identifying a subscription associated with the particular SQL query statement, and subscriber routing information;
   in response to a change in the data in the database, performing a join between said parameter table and said subscription template to generate a query;
   executing the query on the database system to identify SQL query statements in the plurality of SQL query statements affected by the change in the data in the database; and
   communicating notification to a computing application corresponding to an identified SQL query statement, said notification indicating a change in the data in the database has occurred.

2. The method as recited in claim 1, further comprising communicating data from the database system to the computing application.

3. The method as recited in claim 1, further comprising retrieving data from the database system.

4. The method as recited in claim 3, further comprising communicating the data retrieved from the database system to the computing application, said updated data reflecting the change in the data in the database.

5. The method as recited in claim 1, further comprising associating the subscription identification value with a subscriber.

6. The method as recited in claim 1, further comprising adding additional parameters to the parameter table, wherein the additional parameters are not based on the created subscription template.

7. A computer readable storage medium having computer readable instructions to instruct a computer to perform a method for providing notifications of changes in a database system comprising:
   receiving a plurality of SQL query plans for querying a relational database system, each SQL query plan corresponding to a computing application that has subscribed to receive notification of changes in the database system effecting output from the database system to the computing application;
   creating a subscription template from the plurality of SQL subscription plans, the template not comprising any constants;
   generating a parameter table from the plurality of SQL query plans, the parameter table comprising for each SQL query plan a constant representing a query value, a subscription plan identification value uniquely identifying a subscription associated with the particular query plan, and subscriber routing information;
   in response to a change in the data in the database, performing a join between said parameter table and said subscription template to generate a query;
   executing the query on the database system to identify SQL query plans in the plurality of SQL query plans affected by the change in the data in the database; and
   communicating notification to a computing application corresponding to an identified SQL query plan, said notification indicating the change in the data in the database has occurred.

8. A system to increase subscription scalability in an electronic database environment comprising:
   a computing processor;
   computing memory communicatively coupled to said computing processor, said computing memory having stored thereon instructions executable by said computing processor for providing the following:
   a relational database system, the database system capable of accepting and processing subscriptions by cooperating services and/or computing applications, the subscriptions offering query templates for execution on database system to retrieve desired data;
   a notification manger, the notification manager operating on the database system to identify changes in data in the database system and to provide notifications to the cooperating services and/or computing applications of database system changes;

an optimization module, the optimization module using SQL queries originating from subscribers to create subscription templates, the templates not comprising any constants and being paramterized to create a parameter table, said parameter table comprising for each query a constant representing a query value, a subscription identification value uniquely identifying a subscription associated with a particular SQL query, and subscriber routing information, wherein said notification manager is adapted to:

join the parameter table with at least one of the subscription templates to generate a notification query, execute the notification query on the database system to identify SQL queries affected by changes in the database system, and communicate notification to a computing application corresponding to an identified SQL query, said notification indicating a change in the data in the database has occurred.

9. The system as recited in claim 8, wherein the optimization module comprises a computing application.

10. The system as recited in claim 8, further comprising a communication means, the communication means for use in communicating data between the database system and the cooperating services and/or computing applications.

11. The system as recited in claim 9, further comprising a spool, the spool used to spool subscription queries.

12. The system as recited in claim 11, further comprising a filter, the filter used to filter out subscription queries.

13. The system as recited in claim 8, wherein the notification manager and the database system reside in the same data environment.

14. The system as recited in claim 13, wherein the notification manager, the database system, and the optimization module reside in the same environment.

15. A method for increasing subscription scalability in electronic data environments comprising:

accepting subscriptions from cooperating services and/or computing applications by a relational database system, the subscriptions comprising SQL queries for querying the database system;

processing the SQL queries to generate query templates, the query templates having queries and not comprising any constants;

parameterizing the query templates to generate a parameter table, said parameter table comprising for each query a constant representing a query value, a subscription identification value uniquely identifying a subscription associated with the particular query, and subscriber routing information;

in response to a change in the data in the database, joining the parameter table with the query templates to generate a notification query;

executing the notification query on the database system to identify SQL queries affected by the change in the data in the database; and communicating notification to a computing application corresponding to an identified SQL query, said notification indicating the change in the data in the database has occurred.

16. The method as recited in claim 15, further comprising spooling the query templates.

17. The method as recited in claim 16, further comprising filtering the query templates.

18. The method as recited in claim 15, further comprising adding parameters to the parameter table not originating from the query templates.

19. A computer readable storage medium having computer readable instructions to instruct a computer to perform a method for increasing subscription scalability in electronic data environments comprising:

accepting subscriptions from cooperating services and/or computing applications by a relational database system, the subscriptions comprising SQL queries for querying the database system;

processing the SQL queries to generate query templates, the query templates not comprising any constants and being formed as a database table;

parameterizing the query templates to generate a parameter table, said parameter table comprising for each query a constant representing a query value, a subscription identification value uniquely identifying a subscription associated with the particular query, and subscriber routing information;

in response to a change in the data in the database, joining the parameter table with the query templates to generate a notification query;

executing the notification query on the database system to identify SQL queries affected by the change in the data in the database; and communicating notification to a computing application corresponding to an identified SQL query, said notification indicating the change in the data in the database has occurred.

* * * * *